UNITED STATES PATENT OFFICE.

OLAVUS C. LANGSETH, OF GRAND FORKS, DAKOTA TERRITORY.

INSECTICIDE.

SPECIFICATION forming part of Letters Patent No. 395,065, dated December 25, 1888.

Application filed October 16, 1888. Serial No. 288,258. (No specimens.)

*To all whom it may concern:*

Be it known that I, OLAVUS C. LANGSETH, a citizen of the United States, residing at Grand Forks, in the county of Grand Forks and Territory of Dakota, have invented a new and useful Composition of Matter to be Used for the Destruction of Chinch-Bugs, of which the following is a specification.

My composition consists of the following ingredients, combined in the proportions stated, viz: ground ginger, one pound; salt, one pound. These ingredients are to be thoroughly mingled and put up in merchantable packages.

In using the above-named composition, if the season be dry, the powder may be added to sixteen gallons of water and applied immediately after the grain has been removed from the ground; but if the season be wet the powder may be spread upon the ground broadcast or by means of a drill or other suitable mechanical appliance, allowing the rain to dissolve the matter and impregnate the earth therewith.

The compound may be mixed with grain and applied at seeding time, thus saving time and labor.

If the composition be used in liquid form, a sprinkler such as is used in cities for watering streets will probably produce the best results; but where such an one cannot be obtained, or if it should prove too expensive, a substitute may be improvised by attaching an ordinary garden or lawn hose to a faucet or hollow tube inserted near the bottom of a barrel mounted upon a wagon, cart, or other suitable conveyance.

By the use of this compound, either in liquid form or powdered state, every chinch-bug in a field may be destroyed, and ground impregnated with it will not be invaded by the pests.

What I claim, and desire to secure by Letters Patent of the United States, is—

The herein-described composition of matter, prepared in merchantable packages ready for the user, to be used in the destruction of chinch-bugs in the manner substantially as set forth herein, consisting of ginger and salt in the proportions specified.

OLAVUS C. LANGSETH.

Witnesses:
P. J. BYE,
WM. ACKERMAN.